US011233974B1

(12) United States Patent
Adcock et al.

(10) Patent No.: US 11,233,974 B1
(45) Date of Patent: Jan. 25, 2022

(54) VIRTUAL ENVIRONMENTS ASSOCIATED WITH PROCESSED VIDEO STREAMS

(71) Applicant: Capital One Services, LLC, McLean, VA (US)

(72) Inventors: Lee Adcock, Midlothian, VA (US); Vamsi Kavuri, Richmond, VA (US); Jignesh Rangwala, Glen Allen, VA (US); Mehulkumar Jayantilal Garnara, Glen Allen, VA (US); Muthukumaran Vembuli, Glen Allen, VA (US); Santhi Sridharan, Glen Allen, VA (US); Soumyajit Ray, Glen Allen, VA (US); Steven Voltz, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/139,477

(22) Filed: Dec. 31, 2020

(51) Int. Cl.
*H04N 7/15* (2006.01)
*H04N 7/14* (2006.01)
*G06F 3/16* (2006.01)

(52) U.S. Cl.
CPC ............ *H04N 7/157* (2013.01); *G06F 3/167* (2013.01); *H04N 7/147* (2013.01); *H04N 7/152* (2013.01)

(58) Field of Classification Search
USPC ...................................... 348/14.03
See application file for complete search history.

(56) References Cited

U.S. PATENT DOCUMENTS

| | | | |
|---|---|---|---|
| 9,900,555 B1* | 2/2018 | Barreto | H04S 7/302 |
| 10,158,827 B2* | 12/2018 | Cahill | H04N 7/152 |
| 2010/0302446 A1* | 12/2010 | Mauchly | H04N 7/15 348/598 |
| 2011/0276902 A1* | 11/2011 | Li | H04N 7/15 715/757 |

* cited by examiner

*Primary Examiner* — Amal S Zenati
(74) *Attorney, Agent, or Firm* — Harrity & Harrity, LLP

(57) ABSTRACT

In some implementations, a system may receive a plurality of video streams, wherein each video stream is associated with a user of a client device, and wherein the plurality of video streams are associated with a virtual session involving the plurality of client devices. The system may process the plurality of video streams to produce a plurality of processed video streams in which backgrounds of the plurality of video streams are removed. The system may generate a virtual environment that includes a common virtual background, wherein the virtual environment is to be associated with the plurality of processed video streams. The system may transmit one or more output video streams that include the virtual environment with the common virtual background and one or more processed video streams of the plurality of processed video streams.

20 Claims, 9 Drawing Sheets

US 11,233,974 B1

VIRTUAL ENVIRONMENTS ASSOCIATED WITH PROCESSED VIDEO STREAMS

BACKGROUND

Video conferencing involves the reception and transmission of audio-video signals by users at different locations, which enables communication between the users in real time. Video conferencing may be supported using a wide variety of devices, such as mobile phones, desktop computers, laptop computers, tablet computers, and/or smart televisions. Video conferencing may be useful in a workplace environment, in which users are located in different geographical regions. Video conferencing may provide other features, such as screen sharing, chat, meeting recording and transcription, etc.

SUMMARY

In some implementations, a system for transmitting a virtual environment associated with processed video streams includes one or more memories; and one or more processors, communicatively coupled to the one or more memories, configured to: receive, from a first client device, a first video stream associated with a first user of the first client device; process the first video stream to produce a first processed video stream in which a first background associated with the first video stream is removed and a first foreground associated with the first video stream is retained, wherein the first foreground includes video of the first user; receive, from a second client device, a second video stream associated with a second user of the second client device, wherein the first video stream and the second video stream are associated with a virtual video session involving the first user and the second user; process the second video stream to produce a second processed video stream in which a second background associated with the second video stream is removed and a second foreground associated with the second video stream is retained, wherein the second foreground includes video of the second user; create a virtual environment that includes a common virtual background based on the virtual video session, wherein the virtual environment is to be associated with the first processed video stream and the second processed video stream; transmit, to the first client device, a third video stream of the virtual environment with the common virtual background, and one or more of the first processed video stream or the second processed video stream; and transmit, to the second client device, a fourth video stream of the virtual environment with the common virtual background, and one or more of the first processed video stream or the second processed video stream.

In some implementations, a method of transmitting a virtual environment associated with processed video streams includes receiving, by a system from a plurality of client devices, a plurality of video streams, wherein each video stream is associated with a user of a client device, and wherein the plurality of video streams are associated with a virtual session involving the plurality of client devices; processing, by the system, the plurality of video streams to produce a plurality of processed video streams in which backgrounds of the plurality of video streams are removed; generating, by the system, a virtual environment that includes a common virtual background, wherein the virtual environment is to be associated with the plurality of processed video streams; and transmitting, by the system to the plurality of client devices, one or more output video streams that include the virtual environment with the common virtual background and one or more processed video streams of the plurality of processed video streams.

In some implementations, a non-transitory computer-readable medium storing a set of instructions includes one or more instructions that, when executed by one or more processors of a device, cause the device to: receive, from a first client device, a first video stream associated with a first user of the first client device; receive, from a second client device, a second video stream associated with a second user of the second client device; create a virtual environment that includes a common virtual background, wherein the virtual environment is to be associated with the first video stream and the second video stream; and transmit, to the first client device and the second client device, a third video stream of the virtual environment with the common virtual background, a portion of the first video stream, and a portion of the second video stream.

DETAILED DESCRIPTION

Figure 1A:
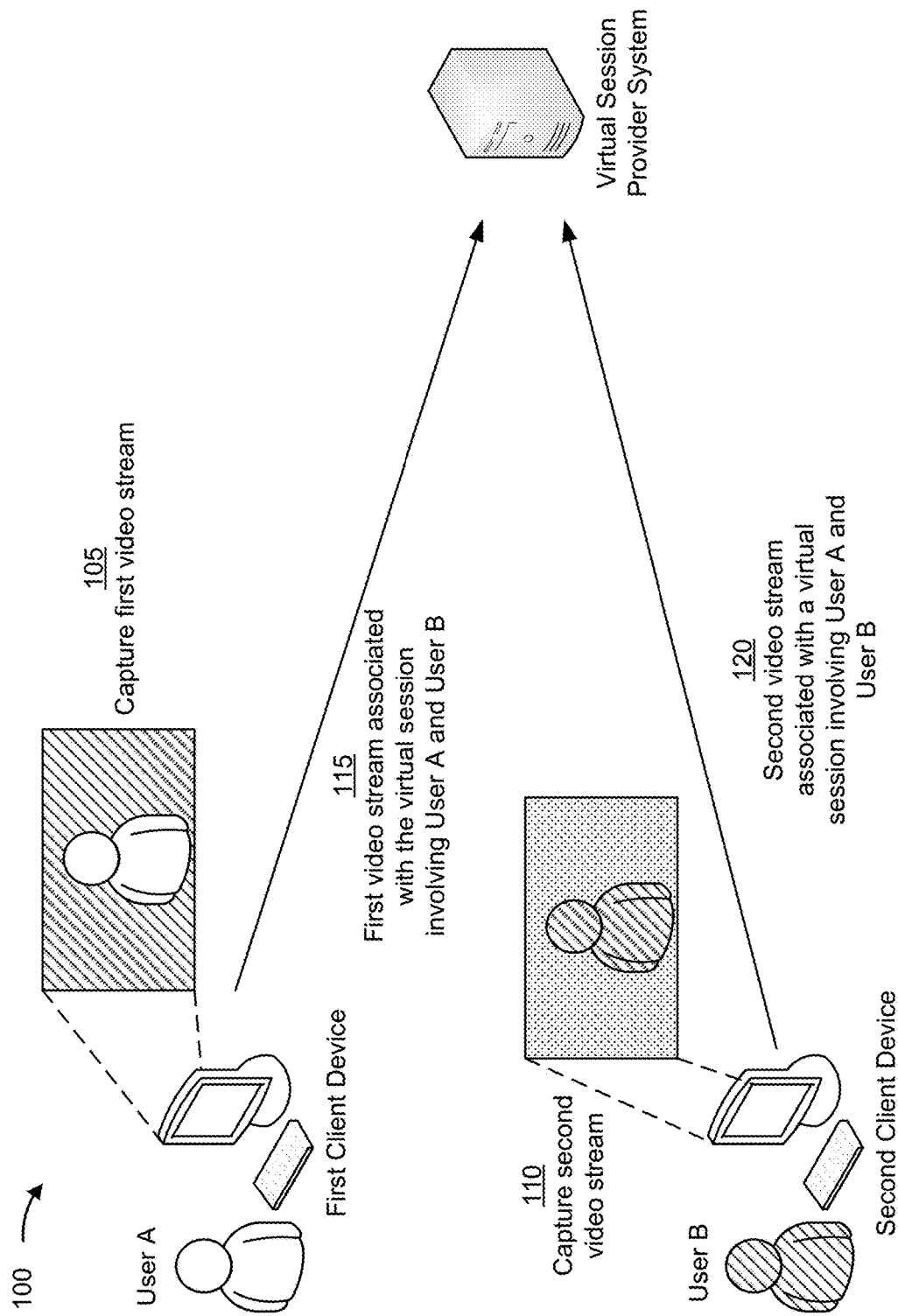
FIGS. 1A-1E are diagrams of an example implementation relating to virtual environments associated with processed video streams.

The following detailed description of example implementations refers to the accompanying drawings. The same reference numbers in different drawings may identify the same or similar elements.

Video conferencing allows users to communicate and collaborate through virtual sessions (or virtual meetings), without the need for the users to be present at a common physical location. For example, users that work remotely from other users may still work together through video conferencing.

One problem with video conferencing is that users may feel disconnected with other users in a virtual session, such as a virtual video session. A first user may be located in a first geographic region and a second user may be located in a second geographic region, which may be tens, hundreds, or even thousands of miles away from the first geographic region. Further, users may be in different settings when participating in the virtual session. For example, the first user may participate in the virtual session from a home office, and the second user may participate in the virtual session from an office conference room. Users may participate in the virtual session from a variety of other locations as well, such as a dining room or living room at the user's home, a park, a vehicle, a bus or train or another form of public transportation, and the like.

As a result, video streams of the users may have different backgrounds. The video streams may also have different views of the users. For example, a first video stream of the first user may show the first user's head, whereas a second video stream of the second user may show the second user's head and shoulders. The first video stream and the second video stream associated with the different views of the first user and the second user, respectively, may cause the first and second users to feel disconnected or disjointed, especially when the first video stream is side-by-side with the second video stream. As a result, a virtual session experience may be less collaborative and not a realistic substitute for more lively and engaging in-person meetings. The discontinuity between the users may lead to a less collaborative and joined experience between the users involved in the virtual session.

Another problem with video conferencing is that users often engage with a large number of video streams at a given time. The virtual session may have a large number of users, and therefore, a large number of separate windows with video streams corresponding to the users. As a result, users may have difficulty scanning the large number of separate windows to find an actively speaking user. When multiple users are speaking at a same time, scanning the large number of separate window to find the multiple actively speaking users may be difficult as well.

In some implementations, to solve the problems described above, as well as a related technical problem of how to create a video stream that inserts images of multiple users that appear realistically positioned, a technical solution is described herein for creating a simulated virtual environment associated with multiple video streams and multiple users. The simulated virtual environment may be a two-dimensional (2D) environment or a three-dimensional (3D) environment for a virtual session involving the multiple users. The simulated virtual environment may include a common virtual background, which may be shared among the multiple users involved in the virtual session. The common virtual background may be shared but may different among the multiple users, since different users may be associated with different virtual locations within the simulated virtual environment. For example, a first portion of the common virtual background may be visible behind a first user, a second portion of the common virtual background may be visible behind a second user, and so on. The first portion of the common virtual background may be associated with a different perspective of the common virtual background as compared to the second portion of the common virtual background. Each user in the virtual session may consume video streams associated with other users in the virtual session, and the video streams may generate the simulated virtual environment with the common virtual background. The multiple video streams may be processed using machine learning or other techniques, such that the multiple video streams of the multiple users are positioned realistically within the simulated virtual environment. The simulated virtual environment with the common virtual background may be a virtual conference room, a virtual park, a virtual restaurant, etc., where the common virtual background may be selected based on an agenda associated with the virtual session (e.g., a happy hour may occur in a virtual restaurant, whereas a work meeting may occur in a virtual conference room). The multiple users may be virtually placed in the simulated virtual environment with the common virtual background, thereby providing the multiple users with a feeling that the virtual session is occurring in a more collaborative and engaging setting.

In some implementations, the multiple video streams may be modified to emphasize the actively speaking user. For example, a video stream associated with the actively speaking user may be displayed with larger dimensions on a display, relative to other video streams associated with non-actively speaking users. As another example, the video stream associated with the actively speaking user may be displayed at a particular position on the display (e.g., at a center position), relative to the other video streams associated with the non-actively speaking users. As a result, the actively speaking user may be more easily identified by other users that are involved in the virtual session.

Previous solutions have not addressed the problem of discontinuity in a virtual session with multiple users. Users in the virtual session are often in disparate locations (e.g., home offices, work offices, coffee shops, etc.). While users may select individualized virtual backgrounds (e.g., a beach, a rainforest, a mountain, etc.) for the virtual session, the individualized virtual backgrounds may suffer from the same problem of discontinuity between the multiple users. Views or perspectives of the users may vary as well, as a video stream associated with one user may show only the user's face with a minimum amount of background of the user's location, while another video stream associated with another user may show a top half of the user's body and a significant amount of background of the user's location. As a result, in previous solutions, the virtual session with multiple users would feel less collaborative. Further, in previous solutions, a video stream associated with an actively speaking user may be emphasized with a colorized border that surrounds the video stream of the actively speaking user, or video streams of multiple users may be toggled or switched to emphasize a video stream of an actively speaking user. However, these previous solutions still result in difficulty and/or increased time when identifying the actively speaking user.

FIGS. 1A-1E are diagrams of an example 100 relating to virtual environments associated with processed video streams. As shown in FIGS. 1A-1E, example 100 includes a first client device, a second client device, a virtual session provider system, and a virtual session provider storage device. These devices are described in more detail in connection with FIGS. 3 and 4.

As shown in FIG. 1A, and by reference number 105, the first client device may capture a first video stream of a first user (User A). The first user may be involved in a virtual session, such as a virtual video session, that includes the first user and a second user. The first client device may include a camera (e.g. a video camera or a web cam) that captures the first video stream of the first user, and the first video stream may include audio and video of the first user. The first video stream may include a first foreground and a first background. The first foreground may include a portion of the video that includes the first user. For example, the first foreground may include video of the first user's face, shoulders, and/or other parts of the first user's body. The first background may include a portion of the video that does not include the first user. For example, the first background may include video of a setting that surrounds the first user. The setting may correspond to an office room, a conference room, a restaurant, a coffee shop, or the like. The setting may include objects (e.g., chairs, art, plants, other people, etc.) that are in proximity to the first user.

As shown by reference number 110, the second client device may capture a second video stream of a second user (User B). The second user may be involved in the virtual session that includes the first user and the second user. The second client device may include a camera that captures the second video stream of the second user, and the second video stream may include audio and video of the second user. The second video stream may include a second foreground and a second background. The second foreground may include a portion of the video that includes the second user, in a similar manner as described above. The second background may include a portion of the video that does not include the second user, in a similar manner as described above.

As shown by reference number 115, the first client device may transmit the first video stream to the virtual session provider system, and the first video stream may be associated with the virtual session involving the first user and the second user. In some aspects, the first video stream may include the first foreground and the first background. Alternatively, the first video stream may include the first foreground and not the first background. In this case, the first client device may remove the first background from the first video stream before transmitting the first video stream to the virtual session provider system.

As shown by reference number 120, the second client device may transmit the second video stream to the virtual session provider system, and the second video stream may be associated with the virtual session involving the first user and the second user. In some aspects, the second video stream may include the second foreground and the second background. Alternatively, the second video stream may include the second foreground and not the second background. In this case, the second client device may remove the second background from the second video stream before transmitting the second video stream to the virtual session provider system.

Figure 1B:
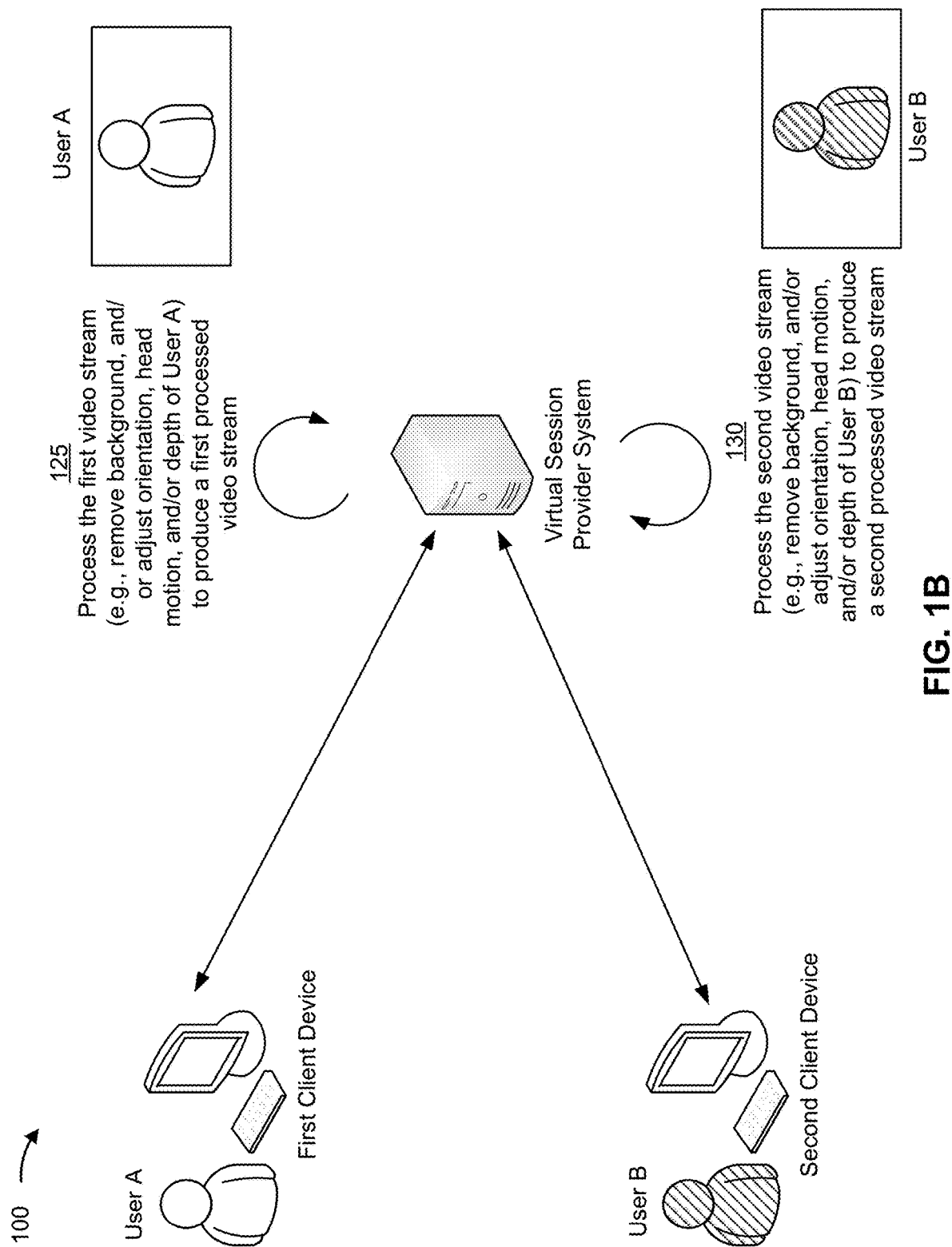

As shown in FIG. 1B, and by reference number 125, after receiving the first video stream from the first client device, the virtual session provider system may process the first video stream to produce a first processed video stream. For example, the virtual session provider system may remove the first background associated with the first video stream to produce the first processed video stream, when the first video stream received from the first client device includes the first background. The virtual session provider system may retain the first foreground corresponding to the video of the first user (e.g., a portion of the first video stream that includes the first user and that does not include a background that does not include the first user).

In some implementations, the virtual session provider system may process the first video stream to adjust a head motion of the first user in the first video stream. For example, the first video stream may be processed to ensure that the head motion associated with the first user satisfies a threshold (e.g., an amount or range of head motion is less than or equal to a threshold). The first video stream may be processed to remove excessive head motion by the first user, which may be distracting to other users. Because head motion of the first user in the first video is relative to the first background, by removing the first background and inserting a shared or common background (as described below), the virtual session provider system may reduce or eliminate the head motion. For example, when generating the first processed video stream, the virtual session provide system may keep the first user's head centered in a particular area overlaid on the common background.

In some implementations, the virtual session provider system may process the first video stream to adjust a depth level associated with the first user in the first video stream. The depth level may correspond to a zoom level, or a percentage of the first video stream that includes the first user's face or other body features. For example, the first video stream may be processed such that the depth level associated with the first user (e.g., an estimated distance between the first user and a camera, a size of the first user's head, or the like) in the first video stream corresponds to a defined level.

In some implementations, the depth level may be adjusted when an image of a user is automatically zoomed in or out, and/or when an image of the user is cropped. When the image of the user is uncropped, the virtual session provider system may perform computations to simulate portions of a user foreground. For example, edge pixels may be extended into the portions of the user foreground, or machine learning approaches may be used to generate portions of the user foreground, which may involve generating shoulders or a body for the user, a top of the user's head, etc., which may have been removed by the user's camera placement.

As shown by reference number 130, the virtual session provider system may receive the second video stream from the second client device. The virtual session provider system may process the second video stream to produce a second processed video stream. For example, the virtual session provider system may remove the second background associated with the second video stream to produce the second processed video stream, when the second video stream received from the second client device includes the second background. The virtual session provider system may retain the second foreground corresponding to the video of the second user (e.g., a portion of the second video stream that includes the second user and that does not include a background that does not include the second user).

In some implementations, the virtual session provider system may process the second video stream to adjust a head motion of the second user in the second video stream, and/or to adjust a depth level associated with the second user in the second video stream, in a similar manner as described above.

In some implementations, the virtual session provider system may process the first and second video streams to adjust the head motions and/or the depth levels of the first and second users in the first and second video streams, respectively, in accordance with a defined set of thresholds and/or criteria. For example, the virtual session provider system may process the first and second video streams in accordance with a common set of thresholds related to head motion, such that an amount of head motion of the first user in the first processed video stream may correspond to an amount of head motion of the second user in the second processed video stream. As another example, the virtual session provider system may process the first and second video streams in accordance with a common set of thresholds related to the depth level, such that the depth level of the first user in the first processed video stream corresponds to the depth level of the second user in the second processed video stream. By uniformly adjusting the head motion and/or depth level for the first user and the second user when processing the first video stream and the second video stream, respectively, a view the first user in the first processed video stream may correspond to a view of the second user in the second processed video stream. In other words, the first and second users may appear more realistic and cohesive in the first and second processed video streams, respectively.

In some implementations, the virtual session provider system may process video streams to remove backgrounds, retain foregrounds, adjust user head motions, adjust user depth levels, etc. using a variety of computer vision, image/video recognition techniques, object detection, image/video processing and editing techniques, machine learning-based approaches, and/or deep learning-based approaches.

In some implementations, the virtual session provider system may analyze a video stream to distinguish between a background in the video stream and a foreground in the video stream. For example, the virtual session provider system may detect objects in the video stream. The virtual session provider system may determine that certain detected objects (e.g., a user's hat, or a user's glasses) correspond to the user, and are therefore not part of the background. In other words, these detected objects may correspond to the foreground that includes video of the user. On the other hand, the virtual session provider system may determine that other detected objects (e.g., part of a room, a wall, a painting, a door, a desk, décor, a floor, a ceiling, electronic equipment or device, or the like) do not correspond to the user, and are therefore part of the background, which may be excluded from the video stream.

In some implementations, the virtual session provider system may analyze the video stream to detect a user head motion and/or a user depth level associated with the user in the video stream. The virtual session provider system may determine whether to perform an adjustment to the user head motion and/or the user depth level. In some implementations, the virtual session provider system may assign values to the user head motion and/or the user depth level. The virtual session provider system may compare the values to a stored set of default values, and based on the comparison, the virtual session provider system may determine whether to perform an adjustment to the user head motion and/or the user depth level. Alternatively, the virtual session provider system may provide the values to a machine learning model, and based on an output from the machine learning model, the virtual session provider system may determine whether to perform an adjustment to the user head motion and/or the user depth level. The machine learning model may be trained using historical data on user head motions, user default levels, etc. As a result, the virtual session provider system may adjust the user head motion and/or the user depth level to provide improved realism and cohesiveness to processed video streams associated with users.

Figure 1C:
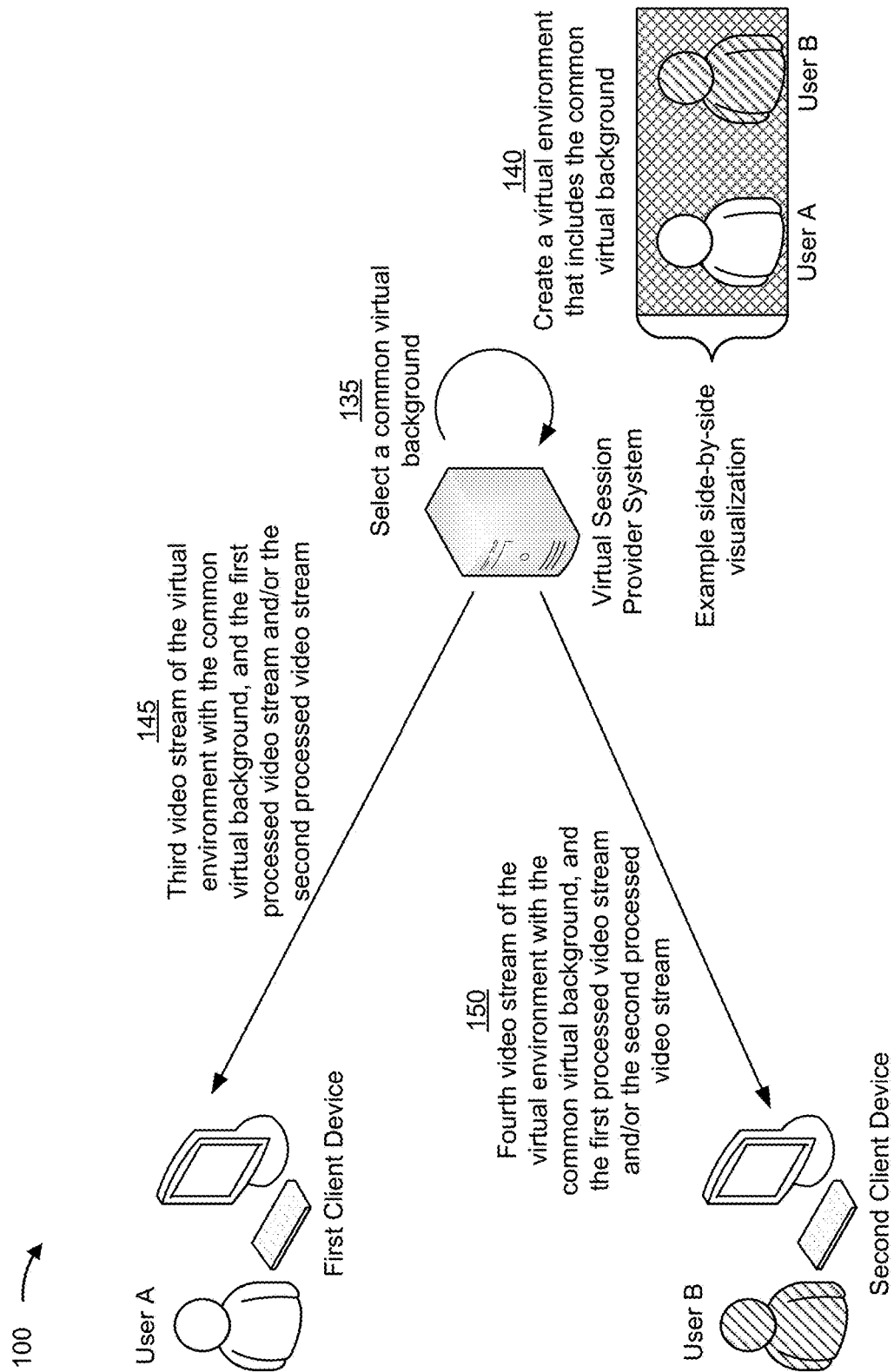

As shown in FIG. 1C, and by reference number 135, the virtual session provider system may select a common virtual background (sometimes referred to as a shared virtual background) for a simulated virtual environment associated with the first and second processed video streams. The common virtual background may be a 2D background or a 3D background. The virtual session provider system may select the common virtual background based on the virtual session involving the first user and the second user. As an example, the common virtual background may correspond to a virtual conference room, a virtual park, a virtual restaurant, etc., depending on the virtual session involving the first user and the second user. In some cases, the common virtual background may correspond to a 2D or 3D image of a conference room, a park, a restaurant, etc.

In some implementations, the virtual session provider system may receive, from the first client device or the second client device, an indication of the common virtual background to be associated with the simulated virtual environment. The virtual session provider system may select the common virtual background based on the indication received from the first client device or the second client device.

For example, a client device associated with a user that organized the virtual session may transmit the indication of the common virtual background to the virtual session provider system. The user may organize the virtual session to discuss a business development strategy, and a suitable location for the virtual session may be a conference room. In this example, the client device may transmit an indication that the common virtual background is to be a virtual conference room.

In some implementations, the virtual session provider system may select the common virtual background based on one or more characteristics associated with the virtual session. For example, the virtual session provider system may retrieve information associated with the virtual session, such as an electronic calendar invitation or an electronic document that outlines an agenda for the virtual session. The virtual session provider system may determine the characteristics associated with the virtual session using natural language processing or related techniques. The virtual session provider system may access the virtual session provider storage device to identify common virtual background(s) that correspond to the characteristics of the virtual session. The virtual session provider system may select, from the virtual session provider storage device, the common virtual background that corresponds to the characteristics associated with the virtual session.

As an example, the virtual session provider system may determine, from an electronic calendar invitation associated with the virtual session, that the virtual session is a virtual social event after work. The virtual session provider system may determine, from the electronic calendar invitation, that users are encouraged to consume food when participating in the virtual session. In this example, the virtual session provider system may select a virtual restaurant, from the virtual session provider storage device, based on the virtual session being associated with the virtual social event.

In some implementations, the virtual session provider system may determine a type of virtual session (e.g., work-related virtual session, social virtual session) based on a time associated with the virtual session. For example, when the virtual session corresponds to work hours, the virtual session provider system may select a virtual conference room for the virtual session. As another example, when the virtual session corresponds to hours commonly associated with a happy hour (e.g., 5 PM to 7 PM), the virtual session provider system may select a virtual restaurant for the virtual session.

As another example, the virtual session provider system may determine, from an electronic calendar invitation associated with the virtual session, that the virtual session includes three users that often meet together to discuss company financial statements. Based on historical data, the virtual session provider system may determine that these three users often hold virtual sessions in a virtual garden. In this example, the virtual session provider system may select, from the virtual session provider storage device, the virtual garden based on the historical data.

As shown by reference number 140, the virtual session provider system may create the simulated virtual environment with the common virtual background. The simulated virtual environment may be a virtual world (e.g., where users appear to be in the same location even though they are actually remote from one another), a virtual reality environment, an augmented reality environment, a mixed reality environment, and/or an extended reality environment. The simulated virtual environment may be associated with the first processed video stream and/or the second processed video stream, the first processed video stream may be associated with the first user, and the second processed video stream may be associated with the second user. In some examples, the first processed video stream and/or the second processed video stream may be presented as an overlay on the simulated virtual environment with the common virtual background.

In some implementations, the virtual session provider system may create the simulated virtual environment to simulate an around-a-table visualization. In this example, the simulated virtual environment may include a virtual table, and the first processed video stream and/or the second processed video stream may be positioned in proximity to the virtual table, such that the first user associated with the first processed video stream and the second user associated with the second processed video stream may appear to be sitting around the virtual table in the simulated virtual environment. Additional details of this around-a-table visualization are described below in connection with FIG. 2.

In some implementations, the virtual session provider system may create the simulated virtual environment to simulate a side-by-side visualization. In this example, the first processed video stream and/or the second processed video stream may be positioned in proximity to each other within the simulated virtual environment, such that the first user associated with the first processed video stream and the second user associated with the second processed video stream may appear to be side-by-side in the simulated virtual environment. Additional details of this side-by-side visualization are described below in connection with FIG. 2.

As shown by reference number 145, the virtual session provider system may transmit, to the first client device, a third video stream of the simulated virtual environment with the common virtual background, and at least one of the first processed video stream and/or the second processed video stream. The first client device may receive the third video stream, and the first client device may display the simulated virtual environment with the common virtual background and the first and/or second processed video stream (e.g., and one or more other video streams if other users with corresponding video streams are involved in the virtual session).

In some implementations, the third video stream may exclude the first processed video stream and may include the second processed video stream. In this case, the third video stream may include the second foreground and the common or shared virtual background, and may exclude the second background, the first foreground, and the first background. The first client device may receive and display the second processed video stream associated with the second user, but the first client device may not receive and display the first processed video stream associated with the first user. In other words, the first user may view the second processed video stream associated with the second user, but not the first processed video stream of the first user, to provide a more realistic representation of a real-world meeting.

In some implementations, the third video stream may include both the first processed video stream and the second processed video stream. In this case, the third video stream may include the first foreground, the second foreground, and the common or shared virtual background, and may exclude the first background and the second background. The first client device may receive and display both the first processed video stream associated with the first user and the second processed video stream associated with the second user. In other words, the first user may view the first and second processed video streams associated with the first user and the second user, within a single video stream against a shared virtual background (e.g., rather than as separate video streams with separate backgrounds).

As shown by reference number 150, the virtual session provider system may transmit, to the second client device, a fourth video stream of the simulated virtual environment with the common virtual background, and at least one of the first processed video stream and/or the second processed video stream. The second client device may receive the fourth video stream, and the second client device may display the simulated virtual environment with the common virtual background and the first and/or second processed video stream.

In some implementations, the fourth video stream may exclude the second processed video stream and may include the first processed video stream. In this case, the fourth video stream may include the first foreground and the common or shared virtual background, and may exclude the first background, the second foreground, and the second background. The second client device may receive and display the first processed video stream associated with the first user, but the second client device may not receive and display the second processed video stream associated with the second user. In other words, the second user may view the first processed video stream associated with the first user, but not the second processed video stream of the second user, to provide a more realistic representation of a real-world meeting.

In some implementations, the fourth video stream may include both the first processed video stream and the second processed video stream. In this case, the fourth video stream (which may be the same as the third video stream in this example) may include the first foreground, the second foreground, and the common or shared virtual background, and may exclude the first background and the second background. The second client device may receive and display both the first processed video stream associated with the first user and the second processed video stream associated with the second user. In other words, the second user may view the first and second processed video streams associated with the first user and the second user, within a single video stream against a shared virtual background (e.g., rather than as separate video streams with separate backgrounds).

While the example above is described in connection with two users, two client devices, and two video streams, the operations described herein may be performed by the virtual session provider system in connection with more than two users, more than two client devices, and more than two video streams. For example, a virtual session may involve three (or four, or five, or more) users with corresponding client devices and video streams. In this case, the video stream provided to a particular client device may include processed video streams from all client devices (e.g., corresponding to all users) from which video is being captured, such that the foregrounds of the video streams are overlaid on a shared virtual background. Alternatively, the video stream provided to a particular client device may include processed video streams from all client devices except for the particular client device, such that the foregrounds of all video streams, except for a video stream captured at the particular client device, are overlaid on a shared virtual background. In some implementations, the video stream provided to a client device may include no more than a threshold number of processed video streams to prevent overcrowding of the video stream (e.g., when the virtual session includes more than a threshold number of video streams and/or client device).

In some implementations, a virtual session may include a client device that does not provide a video stream. For example, a user associated with the client device may have his or her video turned off. In this example, the client device may not capture video of the user. The client device may receive processed video streams from other client devices that are part of the virtual session, but the other client devices may not receive a processed video stream associated with the client device that does not capture video of the user. In some implementations, the client device may provide an image of an avatar or a profile picture associated with the user, rather than the processed video stream. In this case, the other client devices may receive the image of the avatar or the profile, rather than the processed video stream.

In some implementations, the virtual environment with the common virtual background may be a static background that includes static images. The static images may be 2D or 3D images. In this example, the first processed video stream and/or the second processed video stream may be overlaid on the static background. Alternatively, the simulated virtual environment with the common virtual background may be a dynamic background that includes dynamic images and/or video. The dynamic images and/or video may be 2D or 3D images and/or video. The dynamic background may vary depending on whether the simulated virtual environment is transmitted to the first client device or the second client device. For example, the third video stream transmitted to the first client device may include a first portion of the simulated virtual environment, whereas the fourth video stream transmitted to the second client device may include a second portion of the simulated virtual environment. In other words, both the first client device and the second client device may receive a same simulated virtual environment with a same virtual background, but the simulated virtual environment received at the first client device may be at a different perspective as compared to the simulated virtual environment received at the second client device.

As an example, the first client may receive a simulated virtual environment of a virtual restaurant from the virtual session provider system. The second client may also receive the simulated virtual environment of the virtual restaurant from the virtual session provider system. However, the simulated virtual environment received at the first client device may be a different perspective of the virtual restaurant as compared to the simulated virtual environment received at the second client device. For example, the simulated virtual environment received at the first client device may include an entryway of the virtual restaurant, while the simulated virtual environment received at the second client device may include a view of a kitchen in the virtual restaurant. As another example, the simulated virtual environment may be of a virtual conference room. The simulated virtual environment received at the first client device may include a window in the virtual conference room, while the simulated virtual environment received at the second client device may include a whiteboard in the virtual conference room.

In some implementations, since the first processed video stream of the first user may be associated with a first virtual location within the simulated virtual environment, and the second processed video stream of the second user may be associated with a second virtual location within the simulated virtual environment, the simulated virtual environments received at the first and second client devices may be associated with different perspectives of the simulated virtual environment. For example, the first client device may receive a first video stream of a first perspective of the simulated virtual environment from the first user's point of view (e.g., a projector screen in a conference room), and the second client device may receive a second video stream of a second perspective of the simulated virtual environment from the second user's point of view (e.g., a window in the same conference room).

In some implementations, the common virtual background may be configured on a per-client device basis. For example, the virtual session provider system may receive, from the first client device, an indication of a first common virtual background to be associated with the simulated environment. The virtual session provider system may receive, from the second client device, an indication of a second common virtual background to be associated with the simulated environment. The virtual session provider system may transmit, to the first client device, the third video stream of the simulated virtual environment that includes the first common virtual background. The virtual session provider system may transmit, to the second client device, the fourth video stream of the simulated virtual environment that includes the second common virtual background.

As an example, the first client device may indicate that the virtual session is to be held in a virtual conference room, and the second client device may indicate that the same virtual session is to be held in a virtual park. In this example, the third video stream transmitted to the first client device may include the virtual conference room as the common virtual background, and the fourth video stream transmitted to the second client device may include the virtual park as the common virtual background. In other words, from a perspective of the first user, the first user and the second user are participating in the virtual session in the virtual conference room. From a perspective of the second user, the second user and the first user are participating in the virtual session in the virtual park.

Figure 1D:
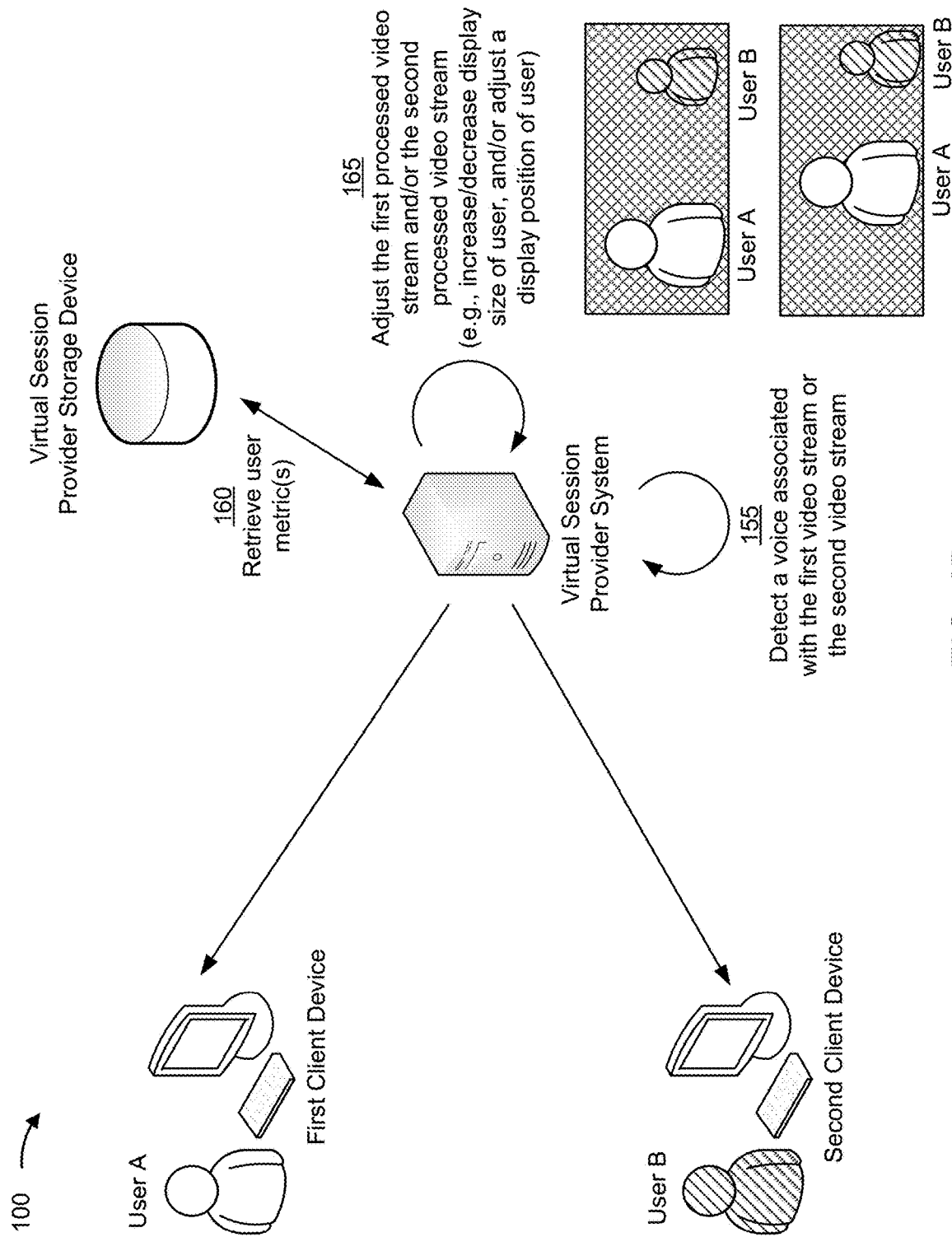

As shown in FIG. 1D, and by reference number 155, the virtual session provider system may detect a voice associated with a video stream, such as the first video stream received from the first client device or the second video stream received from the second client device. The virtual session provider system may use voice detection, speech detection, noise detection, or related techniques to detect the voice associated with the video stream. The detected voice may indicate that a user associated with the video stream is an actively speaking user. As further described below, the virtual session provider system may adjust the video stream based on the voice detected in the video stream.

As shown by reference number 160, the virtual session provider system may retrieve, from the virtual session provider storage device, a metric associated with a user associated with the video stream, such as the first user associated with the first video stream or the second user associated with the second video stream. The metric may indicate a historical amount of time that the user speaks during one or more (e.g., all) past virtual sessions, a historical amount of time that the user speaks during past virtual sessions of a certain type (e.g., social virtual sessions or client-facing virtual sessions), and/or a status associated with the user. The status may indicate a role, a rank, or a position level associated with the user, such as a manager, an independent contractor, an employee with 25 years of experience, a technical expert, etc. As further described below, the virtual session provider system may adjust the video stream based on the metric associated with the user.

As shown by reference number 165, the virtual session provider system may adjust the first processed video stream and/or the second processed video stream based on the detected voice associated with the first video stream or the second video stream, and/or the metric associated with the first user and/or the second user. The first processed video stream and/or the second processed video stream may be adjusted by increasing or decreasing a size of the first user and/or the second user within the video stream (e.g., a size with which video of the first user or the second user is displayed or represented). Further, the first processed video stream and/or the second processed video stream may be adjusted by changing a display position associated with the first user and/or the second user within the video stream (e.g., a location or position at which video of the first user or the second user is displayed or represented).

In some implementations, the virtual session provider system may, when adjusting the first processed video stream, increase a size associated with the first processed video stream to emphasize that the first user is an actively speaking user. The virtual session provider system may, when adjusting the second processed video stream, decrease a size associated with the second processed video stream to emphasize that the second user is not an actively speaking user. As an example, in a side-by-side or around-the-table visualization in which the first user is actively speaking and the second user is not actively speaking, the size associated with the first processed video stream of the first user may be increased relative to the size associated with the second processed video stream of the second user.

In some implementations, the virtual session provider system may, when adjusting the first processed video stream, increase a size associated with the first processed video stream based on a metric (e.g., to emphasize that the first user is associated with a higher status as compared to the second user). The virtual session provider system may, when adjusting the second processed video stream, decrease a size associated with the second processed video stream to emphasize that the second user is associated with a lower status as compared to the first user. As an example, in a side-by-side or around-the-table visualization in which the first user is a senior manager and the second user is a new employee, the size associated with the first processed video stream of the first user may be increased relative to the size associated with the second processed video stream of the second user.

In some implementations, the virtual session provider system may, when adjusting the first processed video stream, adjust a display position associated with the first processed video stream to emphasize that the first user is an actively speaking user. The virtual session provider system may, when adjusting the second processed video stream, adjust a display position associated with the second processed video stream to emphasize that the second user is not an actively speaking user. As an example, in a side-by-side or around-the-table visualization in which the first user is actively speaking and the second user is not actively speaking, the first processed video stream may be moved to a center position and the second processed video stream may be moved to an off-center position.

In some implementations, the virtual session provider system may, when adjusting the first processed video stream, adjust a display position associated with the first processed video stream based on a metric (e.g., to emphasize that the first user is associated with a higher status as compared to the second user). The virtual session provider system may, when adjusting the second processed video stream, adjust a display position associated with the second processed video stream to emphasize that the second user is associated with a lower status as compared to the first user. As an example, in a side-by-side or around-the-table visualization in which the first user is a senior manager and the second user is a new employee, the first processed video stream may be moved to a center position and the second processed video stream may be moved to an off-center position. As another example, a CEO may be depicted at a middle of a screen or at a head of a virtual table, or a group of people from a same department may be shown as being seated near each other.

Figure 1E:
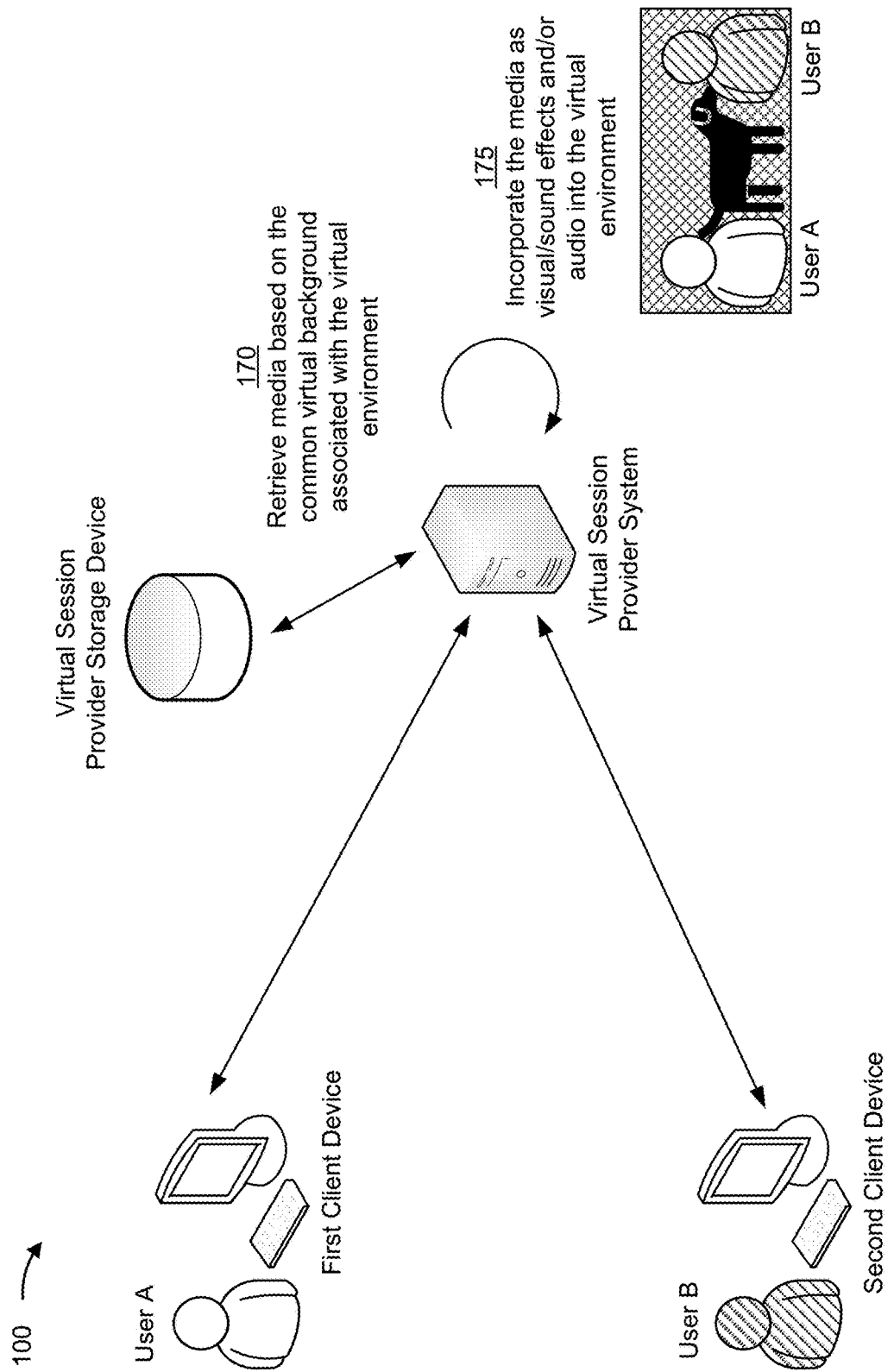

As shown in FIG. 1E, and by reference number 170, the virtual session provider system may retrieve, from the virtual session provider storage device, media based on the common virtual background associated with the simulated virtual environment. The media may include sound files, image files, video files, audio files, animation files, etc. The media retrieved from the virtual session provider storage device may correspond to the simulated virtual environment with the common virtual background. For example, the common virtual background may be associated with key words, identifiers, and/or metadata. The virtual session provider system may look up media in the virtual session provider storage device having key words, identifiers, and/or metadata that correspond to that of the common virtual background.

As an example, when the simulated virtual environment is a virtual restaurant, the media retrieved from the virtual session provider storage device may include sound files of background conversation noise, sound files of background music, or visual effects corresponding to a lighting in the virtual restaurant. As another example, when the simulated virtual environment is a virtual park, the media retrieved from the virtual session provider storage device may include sound files and/or video of a dog barking or birds chirping, sound files and/or video of kids playing, or sound files related to weather such as rain or wind.

As shown by reference number 175, the virtual session provider system may add the media to the simulated virtual environment. For example, the virtual session provider system may incorporate the media as visual effects or sound effects to the simulated virtual environment that is transmitted to the first client device and the second client device. As another example, the virtual session provider system may add the media as background music to the simulated virtual environment. As a result, the simulated virtual environment may be more realistic to the first and second users, as the simulated virtual environment may include sounds and/or sights that mimic actual sounds and sights of physical locations.

In some implementations, creating a simulated virtual environment with a common virtual background may cause a user to feel as if other users are located in a same location (e.g., a same conference room). The simulated virtual environment may include processed video streams corresponding to the users, where video streams of the users may be processed to create a more realistic presentation of the users within the simulated virtual environment. As a result, users may experience a greater sense of collaboration and cohesiveness, even when users are based in different locations.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
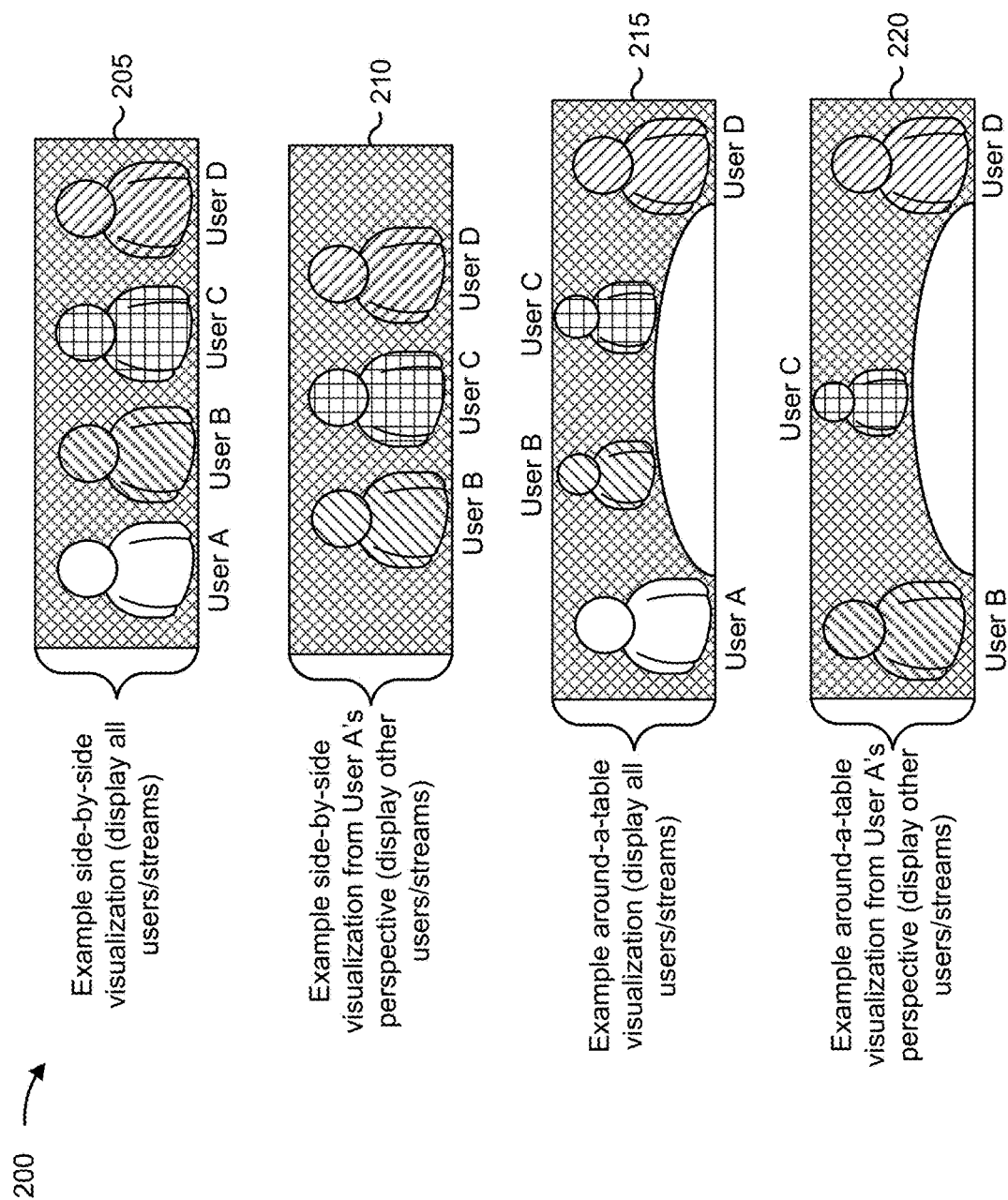
FIG. 2 is a diagram of another example implementation relating to virtual environments associated with processed video streams.

FIG. 2 is a diagram of an example 200 associated with virtual environments associated with processed video streams. FIG. 2 depicts example visualizations of a virtual environment created by processing video streams. The visualizations shown in FIG. 2 may be created by the virtual session provide system, as described above in connection with FIGS. 1A-1E.

As shown by reference number 205, a simulated virtual environment may include a side-by-side visualization, in which the simulated virtual environment may display all processed video streams associated with all users involved in a virtual session. In example 200, the users involved in the virtual session include a first user (User A), a second user (User B), a third user (User C), and a fourth user (User D).

As shown by reference number 210, a simulated virtual environment may include a side-by-side visualization, in which the simulated virtual environment may display processed video streams associated with users involved in the virtual session, other than a video stream associated with a first user (e.g., a user associated with a client device to which the processed video streams are provided). The side-by-side visualization may be from a perspective of the first user, so the side-by-side visualization may exclude the video stream associated with the first user.

As shown by reference number 215, a simulated virtual environment may include an around-the-table visualization, in which the simulated virtual environment may display all processed video streams associated with all users involved in a virtual session. The processed video streams may be positioned around a virtual table in the simulated virtual environment, such that the users may appear to be sitting around the virtual table.

As shown by reference number 220, a simulated virtual environment may include an around-the-table visualization, in which the simulated virtual environment may display processed video streams associated with users involved in the virtual session, other than a video stream associated with a first user. The around-the-table visualization may be from a perspective of the first user (e.g., a user associated with a client device to which the processed video streams are provided), so the around-the-table visualization may not include the video stream associated with the first user.

As indicated above, FIG. 2 is provided as an example. Other examples may differ from what is described with regard to FIG. 2.

Figure 3:
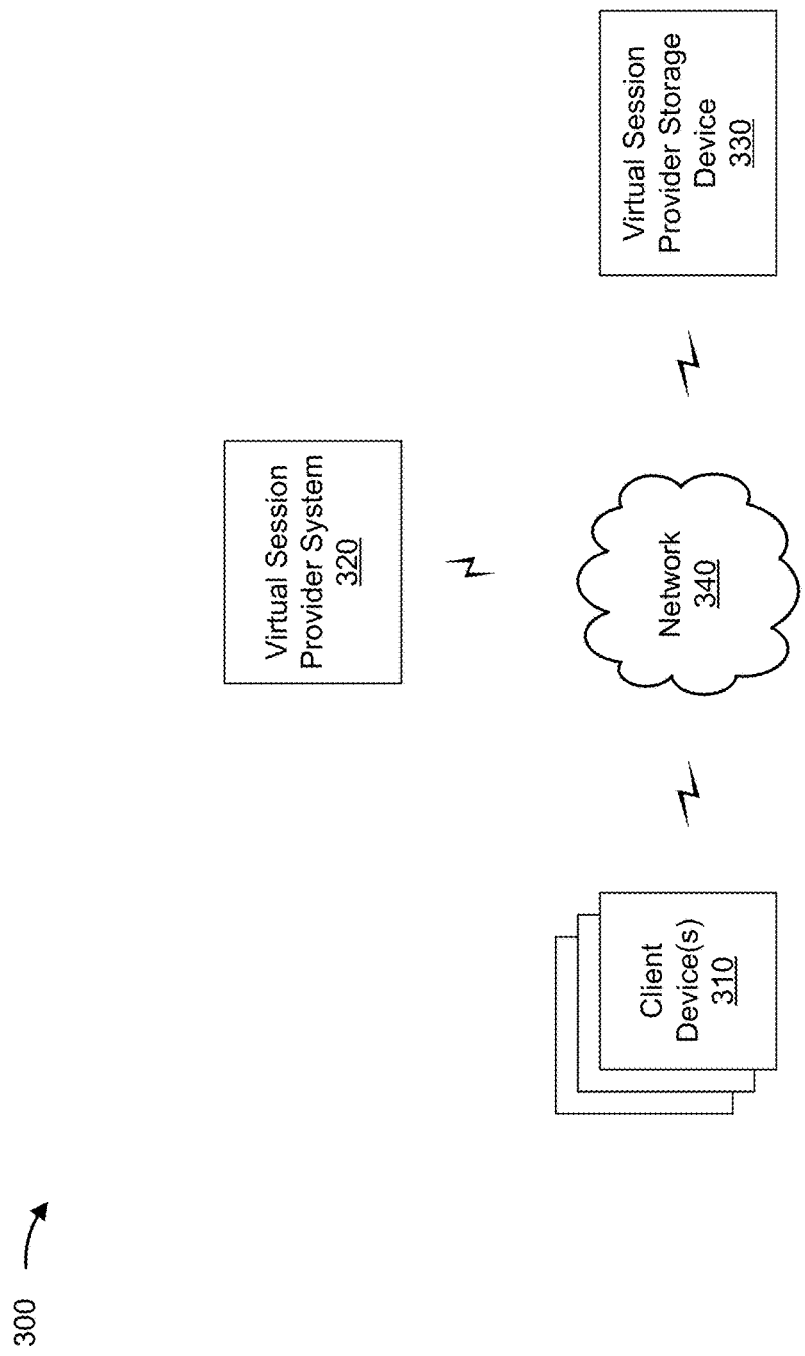
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more client devices 310, a virtual session provider system 320, a virtual session provider storage device 330, and a network 340. Devices of environment 300 may interconnect via wired connections, wireless connections, or a combination of wired and wireless connections.

The client device 310 includes one or more devices capable of receiving, generating, storing, processing, and/or providing information associated with establishing a virtual environment associated with processed video streams, as described elsewhere herein. The client device 310 may include a communication device and/or a computing device. For example, the client device 310 may include a wireless communication device, a phone such as a smart phone, a mobile phone or a video phone, a user equipment, a laptop computer, a tablet computer, a desktop computer, a television, a gaming console, or a similar type of device. In some implementations, the client device 310 may be used to establish a virtual environment associated with processed video streams. The client device 310 may include a camera, such as a video camera, a web cam, a camcorder, or the like, to capture video.

The virtual session provider system 320 includes one or more devices capable of receiving, generating, storing, processing, providing, and/or routing information associated with establishing a virtual environment associated with processed video streams, as described elsewhere herein. The virtual session provider system 320 may include a communication device and/or a computing device. For example, the virtual session provider system 320 may include a server, such as an application server, a client server, a web server, a database server, a host server, a proxy server, a virtual server (e.g., executing on computing hardware), or a server in a cloud computing system. In some implementations, the virtual session provider system 320 includes computing hardware used in a cloud computing environment.

The virtual session provider storage device 330 includes one or more devices capable of receiving, generating, storing, processing, and/or providing information associated with establishing a virtual environment associated with processed video streams, as described elsewhere herein. The virtual session provider storage device 330 may include a communication device and/or a computing device. For example, the virtual session provider storage device 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The virtual session provider storage device 330 may communicate with one or more other devices of environment 300, as described elsewhere herein.

The network 340 includes one or more wired and/or wireless networks. For example, the network 340 may include a cellular network, a public land mobile network, a local area network, a wide area network, a metropolitan area network, a telephone network, a private network, the Internet, and/or a combination of these or other types of networks. The network 340 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
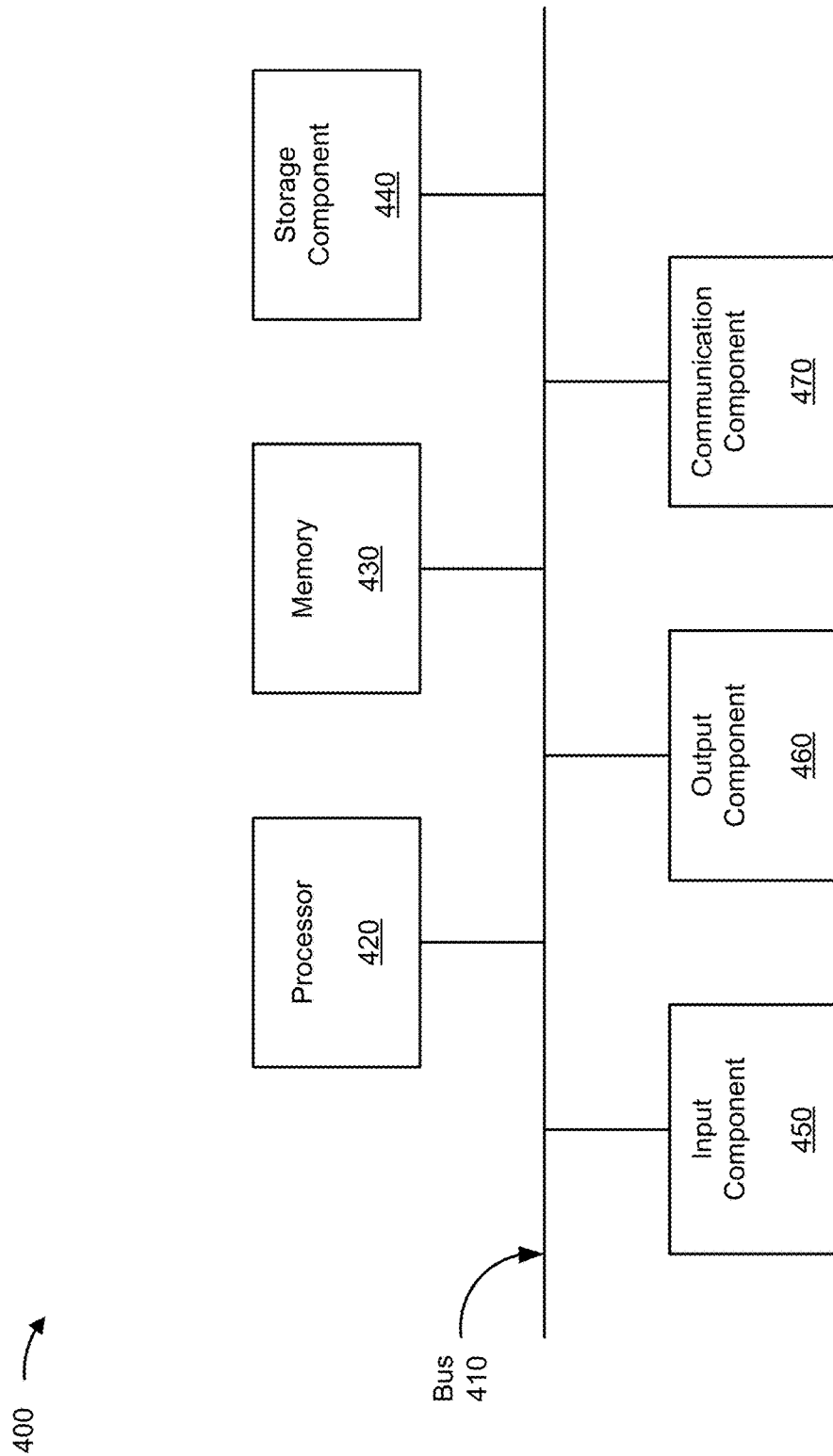
FIG. 4 is a diagram of example components of one or more devices of FIG. 3.

FIG. 4 is a diagram of example components of a device 400, which may correspond to the client device(s) 310, the virtual session provider system 320, and/or the virtual session provider storage device 330. In some implementations, the client device(s) 310, the virtual session provider system 320, and/or the virtual session provider storage device 330 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
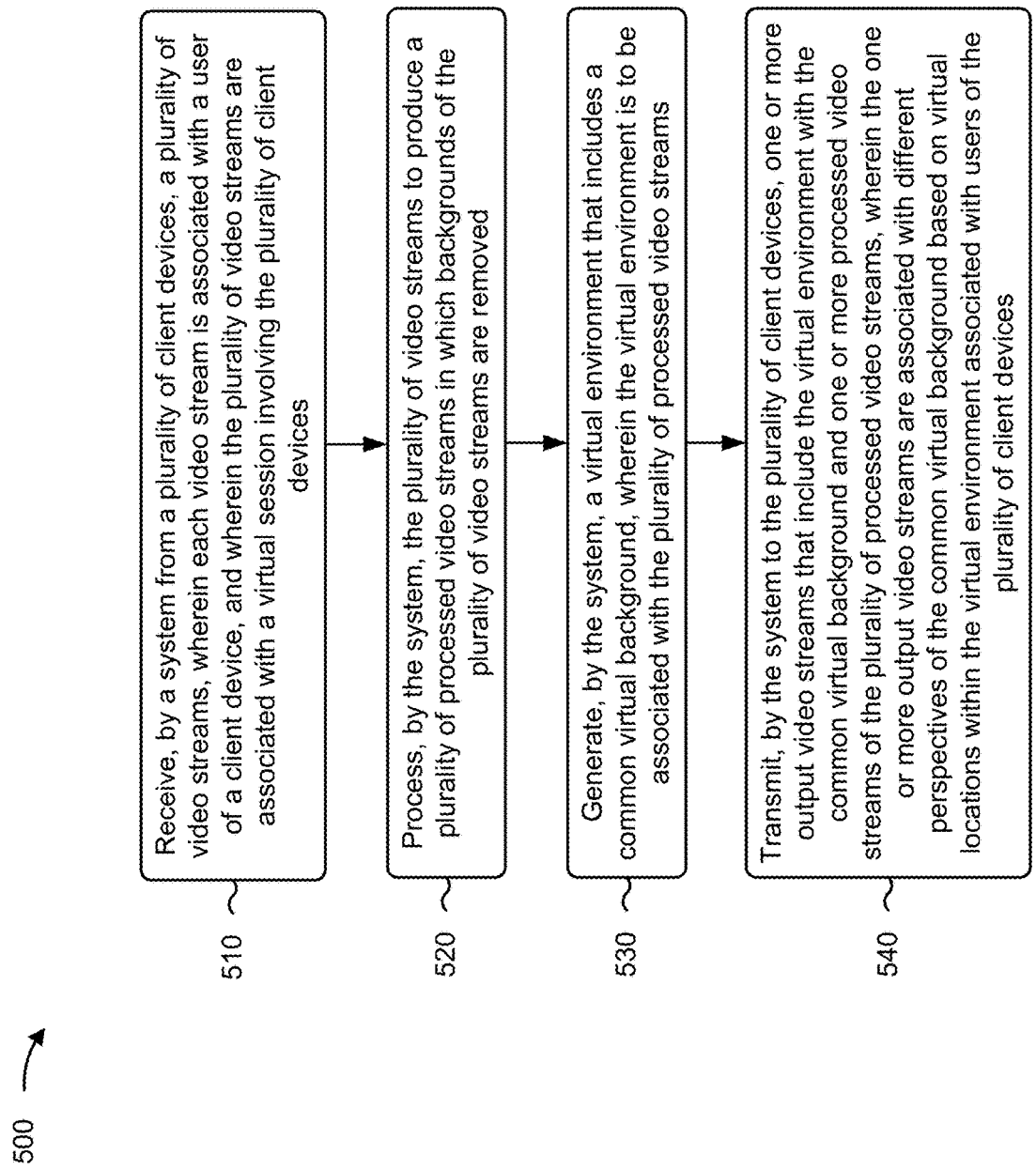
FIG. 5 is a flowchart of an example process relating to transmitting a virtual environment associated with processed video streams.

FIG. 5 is a flowchart of an example process 500 associated with establishing virtual environments associated with processed video streams. In some implementations, one or more process blocks of FIG. 5 may be performed by a system (e.g., client device(s) 310, virtual session provider system 320, and/or virtual session provider storage device 330). In some implementations, one or more process blocks of FIG. 5 may be performed by another device or a group of devices separate from or including the system, such as client device(s) 310, virtual session provider system 320, and/or virtual session provider storage device 330. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving a plurality of video streams (block 510). In some implementations, each video stream is associated with a user of a client device. In some implementations, the plurality of video streams are associated with a virtual session involving the plurality of client devices. As further shown in FIG. 5, process 500 may include processing the plurality of video streams to produce a plurality of processed video streams in which backgrounds of the plurality of video streams are removed (block 520). As further shown in FIG. 5, process 500 may include generating a virtual environment that includes a common virtual background (block 530). In some implementations, the virtual environment is to be associated with the plurality of processed video streams. As further shown in FIG. 5, process 500 may include transmitting one or more output video streams that include the virtual environment with the common virtual background and one or more processed video streams of the plurality of processed video streams (block 540).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for transmitting a virtual environment associated with processed video streams, the system comprising:
one or more memories; and
one or more processors, communicatively coupled to the one or more memories, configured to:
receive, from a first client device, a first video stream associated with a first user of the first client device;
process the first video stream to produce a first processed video stream in which a first background associated with the first video stream is removed and a first foreground associated with the first video stream is retained, wherein the first foreground includes video of the first user;
receive, from a second client device, a second video stream associated with a second user of the second client device, wherein the first video stream and the second video stream are associated with a virtual video session involving the first user and the second user;
process the second video stream to produce a second processed video stream in which a second background associated with the second video stream is removed and a second foreground associated with the second video stream is retained, wherein the second foreground includes video of the second user;
select a common virtual background based on among the following:
calendar invitation information associated with the virtual video session,
agenda information associated with the virtual video session,
historical data associated with users of the virtual video session, and
information associated with the virtual video session determined based on natural language processing;
create the virtual environment that includes the common virtual background, wherein the virtual environment is to be associated with the first processed video stream and the second processed video stream;
add, to the virtual environment, media that is selected based on the common virtual background;
transmit, to the first client device, a third video stream of the virtual environment with the common virtual background, and one or more of the first processed video stream or the second processed video stream, wherein the third video stream is associated with a first portion of the common virtual background; and
transmit, to the second client device, a fourth video stream of the virtual environment with the common virtual background, and one or more of the first processed video stream or the second processed video stream, wherein the fourth video stream is associated with a second portion of the common virtual background that is different than the first portion of the common virtual background.

2. The system of claim 1, wherein:
the third video stream excludes the first processed video stream and includes the second processed video stream; and
the fourth video stream excludes the second processed video stream and includes the first processed video stream.

3. The system of claim 1, wherein:
the one or more processors, when processing the first video stream, are configured to adjust a first head motion associated with the first user or a first depth associated with the first user; and
the one or more processors, when processing the second video stream, are configured to adjust a second head motion associated with the second user or a second depth associated with the second user.

4. The system of claim 1, wherein the one or more processors are further configured to:
detect a voice associated with the first video stream, wherein the detected voice indicates that the first user associated with the first video stream is an actively speaking user; and
adjust the first processed video stream and the second processed video stream based on the detected voice associated with the first video stream.

5. The system of claim 4, wherein:
the one or more processors, when adjusting the first processed video stream, are configured to increase a first size associated with the first processed video stream to emphasize that the first user is the actively speaking user; or
the one or more processors, when adjusting the second processed video stream, are configured to decrease a second size associated with the second processed video stream to emphasize that the second user is currently not speaking.

6. The system of claim 1, wherein the one or more processors are further configured to:
detect a voice associated with the first video stream, wherein the detected voice indicates that the first user associated with the first video stream is an actively speaking user; and
adjust a display position of the first processed video stream to emphasize that the first user is the actively speaking user.

7. The system of claim 1, wherein the common virtual background is a first common virtual background or a second common virtual background, and wherein the one or more processors, when transmitting the third video stream of the virtual environment, are configured to:
transmit the third video stream of the virtual environment that includes the first common virtual background to the first client device; and transmit the fourth video stream of the virtual environment that includes the second common virtual background to the second client device.

8. The system of claim 1, wherein the one or more processors are further configured to:
retrieve a metric associated with one or more of the first user or the second user, wherein the metric indicates: an amount of time during which the first user speaks, an amount of time during which the second user speaks, a status or rank associated with the first user, or a status or rank associated with the second user; and
adjust a first display position of the first processed video stream relative to a second display position of the second processed video stream based on the metric associated with one or more of the first user or the second user.

9. The system of claim 1, wherein selecting the common virtual background comprises:
determining one or more characteristics associated with the virtual video session; and
identifying the common virtual background that correspond to the one or more characteristics based on accessing a virtual session provider storage device.

10. A method of transmitting a virtual environment associated with processed video streams, comprising:
receiving, by a system from a plurality of client devices, a plurality of video streams, wherein each video stream is associated with a user of a client device of the plurality of client devices, and wherein the plurality of video streams are associated with a virtual session involving the plurality of client devices;
processing, by the system, the plurality of video streams to produce a plurality of processed video streams in which backgrounds of the plurality of video streams are removed;
selecting, by the system, a common virtual background based on among the following:
calendar invitation information associated with the virtual session,
agenda information associated with the virtual session,
historical data associated with users of the virtual session, and
information associated with the virtual session determined based on natural language processing;
adding, by the system and to the virtual environment, media that is selected based on the common virtual background;
generating, by the system, the virtual environment that includes the common virtual background, wherein the virtual environment is to be associated with the plurality of processed video streams; and
transmitting, by the system to the plurality of client devices, one or more output video streams that include the virtual environment with the common virtual background and one or more processed video streams of the plurality of processed video streams, wherein the one or more output video streams are associated with different perspectives of the common virtual background based on virtual locations within the virtual environment associated with one or more users of the plurality of client devices.

11. The method of claim 10, further comprising:
receiving, from the client device, an indication of the common virtual background to be associated with the virtual environment.

12. The method of claim 10, further comprising:
identifying one or more characteristics associated with the virtual session; and
selecting the common virtual background for the virtual environment based on the one or more characteristics associated with the virtual session.

13. The method of claim 10, further comprising:
adding one or more of visual effects or sound effects to the virtual environment based on the common virtual background associated with the virtual environment.

14. The method of claim 10, further comprising:
adding audio to the virtual environment based on the common virtual background associated with the virtual environment.

15. The method of claim 10, wherein the plurality of processed video streams includes a first processed video stream, a second processed video stream, and a third processed video stream, and the plurality of client devices includes a first client device, a second client device, and a third client device, and transmitting the one or more output video streams that include the virtual environment with the common virtual background comprises one or more of:
transmitting, to the first client device, the second processed video stream and the third processed video stream and excluding the first processed video stream;
transmitting, to the second client device, the first processed video stream and the third processed video stream and excluding the second processed video stream; or
transmitting, to the third client device, the first processed video stream and the second processed video stream and excluding the third processed video stream.

16. The method of claim 10, wherein the virtual environment simulates an around-a-table visualization or a side-by-side visualization using the plurality of processed video streams.

17. A non-transitory computer-readable medium storing a set of instructions, the set of instructions comprising:
one or more instructions that, when executed by one or more processors of a device, cause the device to:
receive, from a first client device, a first video stream associated with a first user of the first client device;
receive, from a second client device, a second video stream associated with a second user of the second client device;
select a common virtual background based on among the following:
calendar invitation information associated with a session related to the first video stream and the second video stream,
agenda information associated with the session,
historical data associated with users of the session, and
information associated with the session determined based on natural language processing;
create a virtual environment that includes the common virtual background, wherein the virtual environment is to be associated with the first video stream and the second video stream;
add, to the virtual environment, media that is selected based on the common virtual background;
transmit, to the first client device, a third video stream of the virtual environment with the common virtual background and the second video stream, wherein the third video stream is associated with a first portion of the common virtual background; and
transmit, to the second client device, a fourth video stream of the virtual environment with the common virtual background and the first video stream, wherein the fourth video stream is associated with a second portion of the common virtual background that is different than the first portion of the common virtual background.

18. The non-transitory computer-readable medium of claim 17, wherein the one or more instructions, when executed by the one or more processors, further cause the device to:
- detect a voice associated with the first video stream, wherein the detected voice indicates that the first user associated with the first video stream is an actively speaking user; and
- adjust the first video stream and the second video stream based on the detected voice associated with the first video stream, wherein the first video stream is adjusted to increase a size associated with the first video stream, and the second video stream is adjusted to decrease a size associated with the second video stream.

19. The non-transitory computer-readable medium of claim 17, wherein the one or more instructions, when executed by the one or more processors, further cause the device to:
- process the first video stream to remove a first background associated with the first video stream; and
- process the second video stream to remove a second background associated with the second video stream.

20. The non-transitory computer-readable medium of claim 17, wherein the one or more instructions, when executed by the one or more processors, further cause the device to:
- process the first video stream to retain a first foreground associated with the first video stream, wherein the first foreground includes video of the first user; and
- process the second video stream to retain a second foreground associated with the second video stream, wherein the second foreground includes video of the second user.

\* \* \* \* \*